United States Patent [19]

Kusano et al.

[11] Patent Number: 4,963,923
[45] Date of Patent: Oct. 16, 1990

[54] MICROFILM PROJECTING APPARATUS

[75] Inventors: Hideaki Kusano, Osaka; Masaaki Ito, Yokohama, both of Japan

[73] Assignee: Minolta Camera Kabushiki Kaisha, Osaka, Japan

[21] Appl. No.: 494,944

[22] Filed: Mar. 14, 1990

Related U.S. Application Data

[63] Continuation of Ser. No. 326,297, Mar. 21, 1989, abandoned.

[30] Foreign Application Priority Data

Mar. 23, 1988 [JP] Japan .................. 63-69116

[51] Int. Cl.⁵ .............. G03B 27/74; G03B 27/80; G03B 13/28
[52] U.S. Cl. .......................... 355/68; 355/45
[58] Field of Search ................ 355/43, 45, 68; 354/152, 479

[56] References Cited

U.S. PATENT DOCUMENTS

| 3,977,778 | 8/1976 | Seko et al. ................ 355/68 X |
| 4,260,246 | 4/1981 | Rollenitz ................ 355/45 |
| 4,367,033 | 1/1983 | Watanabe ................ 355/45 X |
| 4,433,906 | 2/1984 | Nakatani et al. ................ 355/68 X |
| 4,589,767 | 5/1986 | Yanagi et al. ................ 355/45 |
| 4,591,264 | 5/1986 | Ueda et al. ................ 355/68 |
| 4,624,547 | 11/1986 | Endo et al. ................ 355/68 X |
| 4,800,413 | 1/1989 | Ito et al. ................ 355/45 |
| 4,811,056 | 3/1989 | Kimura ................ 355/68 |
| 4,860,060 | 8/1989 | Wise et al. ................ 355/45 X |
| 4,879,572 | 11/1989 | Onuki et al. ................ 355/45 |
| 4,885,605 | 12/1989 | Fujita et al. ................ 355/45 X |
| 4,894,681 | 1/1990 | Watanabe et al. ................ 355/45 |
| 4,903,073 | 2/1990 | Saito et al. ................ 355/45 X |

FOREIGN PATENT DOCUMENTS

| 228640 | 7/1963 | Austria . |
| 59-119407 | 8/1984 | Japan . |
| 59-210432 | 11/1984 | Japan . |
| 61-247157 | 11/1986 | Japan . |
| 63-3557 | 1/1988 | Japan . |

Primary Examiner—Richard A. Wintercorn
Attorney, Agent, or Firm—Willian Brinks Olds Hofer Gilson & Lione

[57] ABSTRACT

A microfilm projecting apparatus for projecting an image of a microfilm on a screen and projecting the same on a photoreceptor, the microfilm projecting apparatus including a reflector movably provided between a first position out of an image projecting light path and a second position in the image projecting light path. The image projecting light travels to the screen when the reflector is at the first position. The reflector moves from the first position to the second position along a plane including the reflecting surface thereof and reflects the image projecting light to the photoreceptor at the second position. A detector is arranged for detecting the density of the image by receiving the image projecting light reflected by the reflector while the reflector is moving from the first position to the second position.

11 Claims, 10 Drawing Sheets

MICROFILM PROJECTING APPARATUS

This application is a continuation of application Ser. No. 07/326,297, filed Mar. 21, 1989 now abandoned

BACKGROUND OF THE INVENTION

1. Field of the Invention

The present invention relates to a microfilm projecting appartus which guides the microfilm image-projecting light to the screen and photoreception means. The microfilm projecting apparatus in the present invention includes a microfilm scanner having a CCD line sensor as the photoreception means for converting an image of a microfilm into electric data, a microfilm reader printer having a photoconductive member as the photoreception means for printing an image of a microfilm on a paper, and so on.

2. Description of Related Art

Any conventional microfilm projecting apparatus measures light of the microfilm image for detecting the density and the position of the image. It is essential for the microfilm projecting apparatus to execute measurement of light before photoreception means processes the microfilm image.

FIG. 1 is a schematic diagram representing an example of the optical system of a conventional microfilm scanner. This optical system is provided with optical-path switching mirror M1 which switches the image projection path into screen S or the line sensor L composed of a CCD. In FIG. 1, M2 and M3 are respectively the scan mirrors, whereas M4 is the stationary reader mirror. This optical system measures light of the microfilm image before the start of the scanning mode in which the microfilm image is scanned. After allowing the optical-path switching mirror M1 to swing itself back to the shelter positon shown by broken line, the optical system executes a light-measuring operation. Concretely, only after the optical-path switching mirror M1 has completed the sheltering movement, scan mirrors M2 and M3 are allowed to move themselves in order that the projected light can be led to the line sensor L before the optical system actually starts the microfilm image light measuring process.

Another example of the optical system of a conventional microfilm scanner shown in FIG. 2 switches the image projection path A without the provision of the optical path switching mirror M1 used for the example shown in FIG. 1. Concretely, while the reader mode is underway, this optical system forming the image projection light path A is oriented to the screen S via the stationary mirrors M5 and M6. This system executes the measurement of light by preliminarily moving the scan mirror M2 into the image projection light path A to thereby guide the projected light to the line sensor L via the scan mirrors M2 and M3.

Nevertheless, any of these conventional microfilm projecting apparatuses still has technical problems to solve as pointed out below.

Referring now to the time chart shown in FIG. 3 showing the operation timing of the prior art shown in FIG. 1, problems are explained below. While the optical-path switching mirror M1 moves itself, i.e., while the optical-path-switching operation is underway, the conventional microfilm projecting apparatus shown in FIG. 1 does not execute the light measurement. Only after completing the optical-path switching operation, this apparatus executes the light measurement. On the other hand, the conventional microfilm projecting apparatus shown in FIG. 2 needs to preliminarily move the scan mirror M2 for switching the optical path before the measurement of light.

SUMMARY OF THE INVENTION

The invention has been achieved for solving those technical problems mentioned above.

A first object of the invention is to provide a novel microfilm projecting apparatus which is capable of securely saving the image processing time.

Another object of the invention is to provide a novel microfilm projecting apparatus which is capable of correctly measuring light at the focused position throughout the entire image region.

Another object of the invention is to provide a novel microfilm projecting apparatus which securely prevents the microfilm image from being projected on the screen even when the image is repeatedly scanned.

Another object of the invention is to provide a compact microfilm projecting apparatus.

A still further object of the invention is to provide an inexpensive microfilm projecting apparatus.

The above and further objects and features of the invention will more fully be apparent from the following detailed description with accompanying drawings.

DESCRIPTION OF THE PREFERRED EMBODIMENTS

Figure 1:
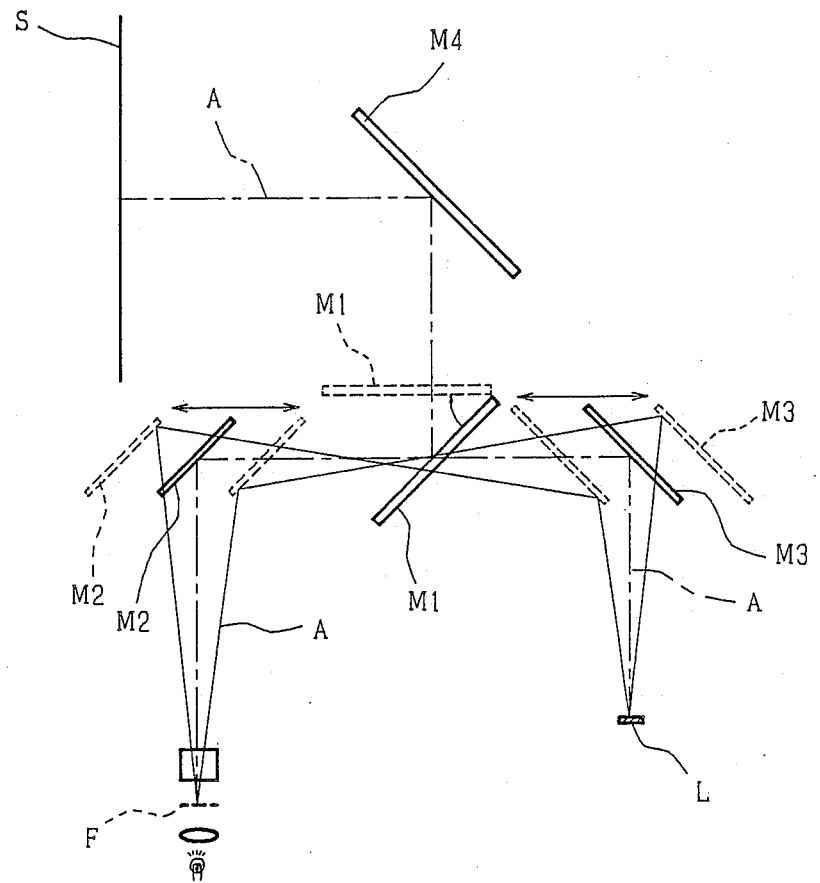
FIGS. 1 and 2 are respectively schematic block diagrams representing the principles of the optical system of coventional microfilm scanners.
Figure 2:
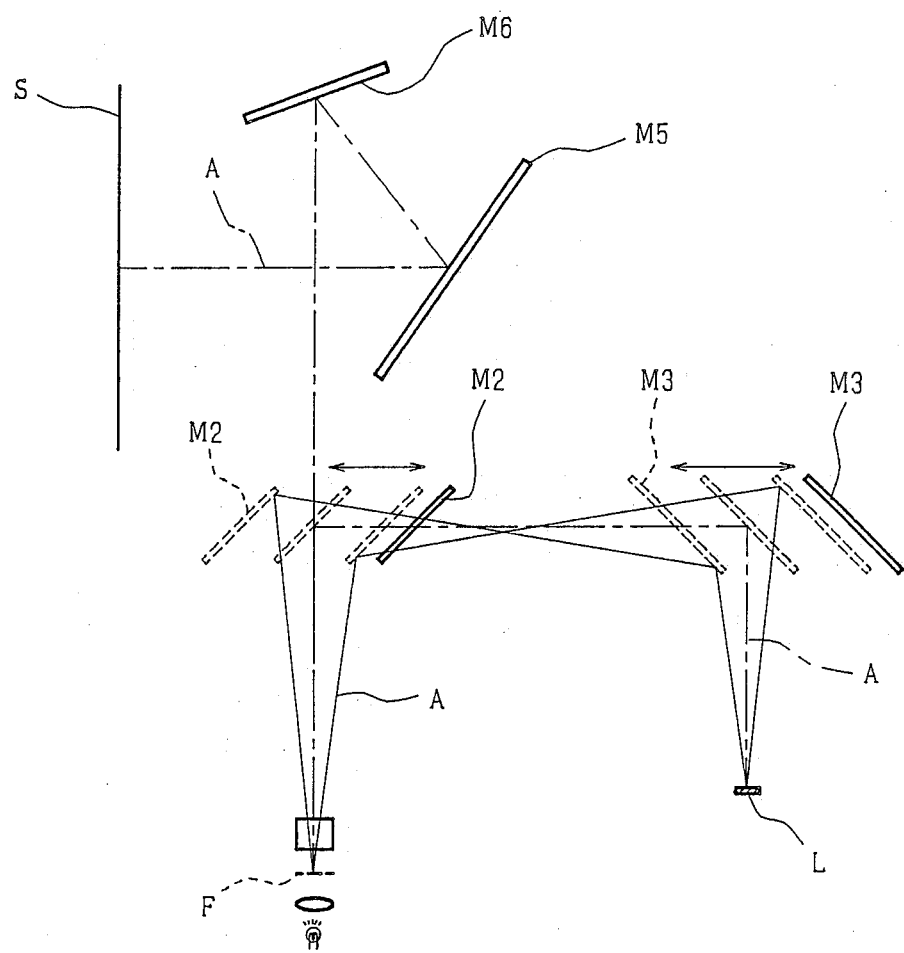
Figure 3:
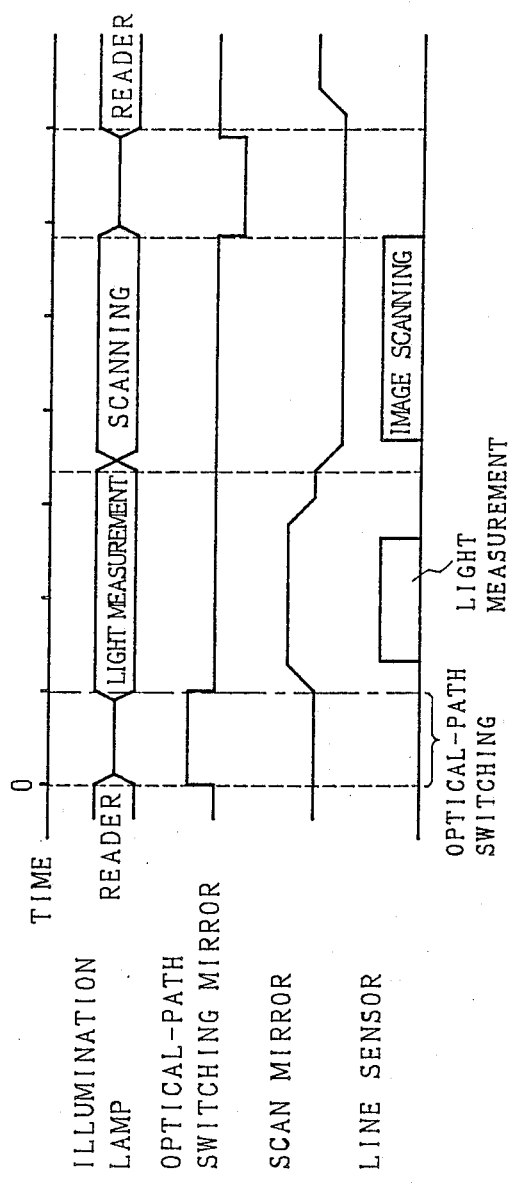
FIG. 3 is a time chart representing the operation timing of a conventional optical system.
Figure 4:
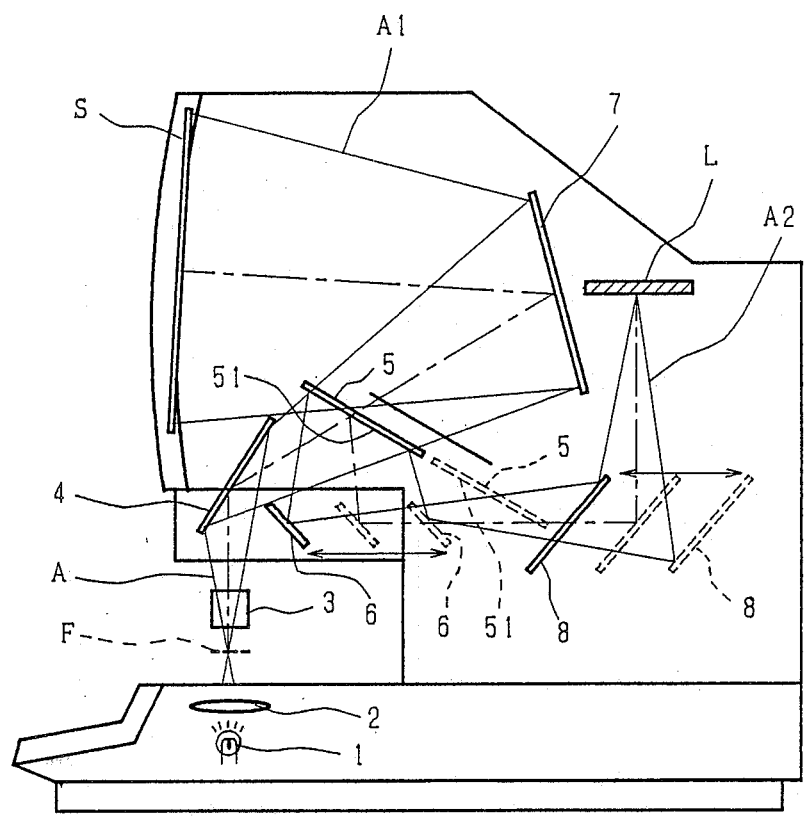
FIG. 4 is a sectional diagram representing the schematic structure of the microfilm projecting apparatus related to the invention.

Referring now to the accompanying drawings, a preferred embodiment of the microfilm projecting apparatus of the invention is described below. FIG. 4 is a schematic sectional diagram of the optical system of the microfilm scanner embodied by the invention. Light from the illumination light source lamp 1 is condensed by the condenser lens 2. Condensed light radiates and permeates the microfilm F loaded in a carrier (not shown) before arriving at the projection lens 3. The image-projecting light-path A of the optical system is thus formed. Image of the microfilm F is enlarged and projected by the projection lens 3, and then arrives at the stationary mirror 4. When in the reader mode, the reader light-path A1 is formed so that it functions as the image projecting light-path A. While the reader mode is underway, the light-path switching mirror 5 is at the shelter position shown by means of broken line in FIG.

4. The first scan mirror 6 is also at the position shown by means of broken line at the right of FIG. 4. These mirrors 5 and 6 remain still by sheltering themselves outside of the reader light-path A1. Light reflected by the stationary mirror 4 proceeds to the stationary reader mirror 7, which then reflects the light so that it can be led to the screen S. The image of microfilm F is enlarged and projected on the screen S which is installed to the upper front of the microfilm scanner for inspection.

On the other hand, when in the scanning mode, scan light-path A2 is formed so that it functions as the image projecting light-path A. The optical system measures light of the microfilm image while the reader mode is turned over to the scanning mode. While the mode switching operation is underway, the transfer mechanism (to be described later on) causes the light-path switching mirror 5 to slide itself from the shelter position (shown by broken line) to the operating position (shown by solid line) as shown in FIG. 4 along the plane of the mirror surface 51. Being activated by the transfer mechanism, the first and second scan mirrors 6 and 8 move themselves in connection with each other from the right-end (shown by broken line) to the left-end (shown by solid line) to execute image scanning. After completing the measurement of light, the light-path switching mirror 5 stops at the operating position, and at the same time, the first and second scan mirrors 6 and 8 move themselves in connection with each other from the left-end to the right-end to execute image scanning. Light bent by the stationary mirror 4 is projected against the first scan mirror 6 by the light path switching mirror 5 which is at the operating position. The projected light is then bent by the first and second scan mirrors 6 and 8 which respectively move themselves at an equal to execute image scanning, and then the light is led to the CCD line sensor L which concurrently functions as photoreception means.

As a result, the image of microfilm F is projected against the CCD line sensor L, and then, the image is exposed for scanning. The scanned image is then converted into a photoelectric signal. The photoelectrically-converted image signal is then outputted via a sample-holder, amplifying circuit, analog-digital (A/D) converter, and comparator, which are not shown in FIG. 4. The output image signal is delivered to an optical-disc memory unit for example so that the image data can be stored provisionally. Alternatively, the outputted image signal is delivered to a laser printer for printing out the image data. Instead of using the CCD line sensor L, when operating the reader printer containing photoreception means having a copy-use photoreceptor, by stopping the movement of the light-path switching mirror 5 at the operating position, copying operation can be executed continuously by repeatedly moving the first and second scan mirrors 6 and 8 to scan the image.

After completing the scanning mode, the optical system restores the reader mode. The light-path switching mirror 5 slides itself to the shelter position where it stops. The first and second scan mirrors 6 and 8 respectively come to a stop at the right-end position.

If an arrangement is made to slide the position of the light-path switching mirror 5 while the scanning mode is underway, the time needed for switching the mode can be shortened. For example, if the light-path switching mirror 5 is transferred by sliding from the operating position to the original shelter position simultaneously with the transfer of the first and second scan mirrors 6 and 8 for the image scanning, the time for returning to the reader mode can be shortened.

Figure 5:
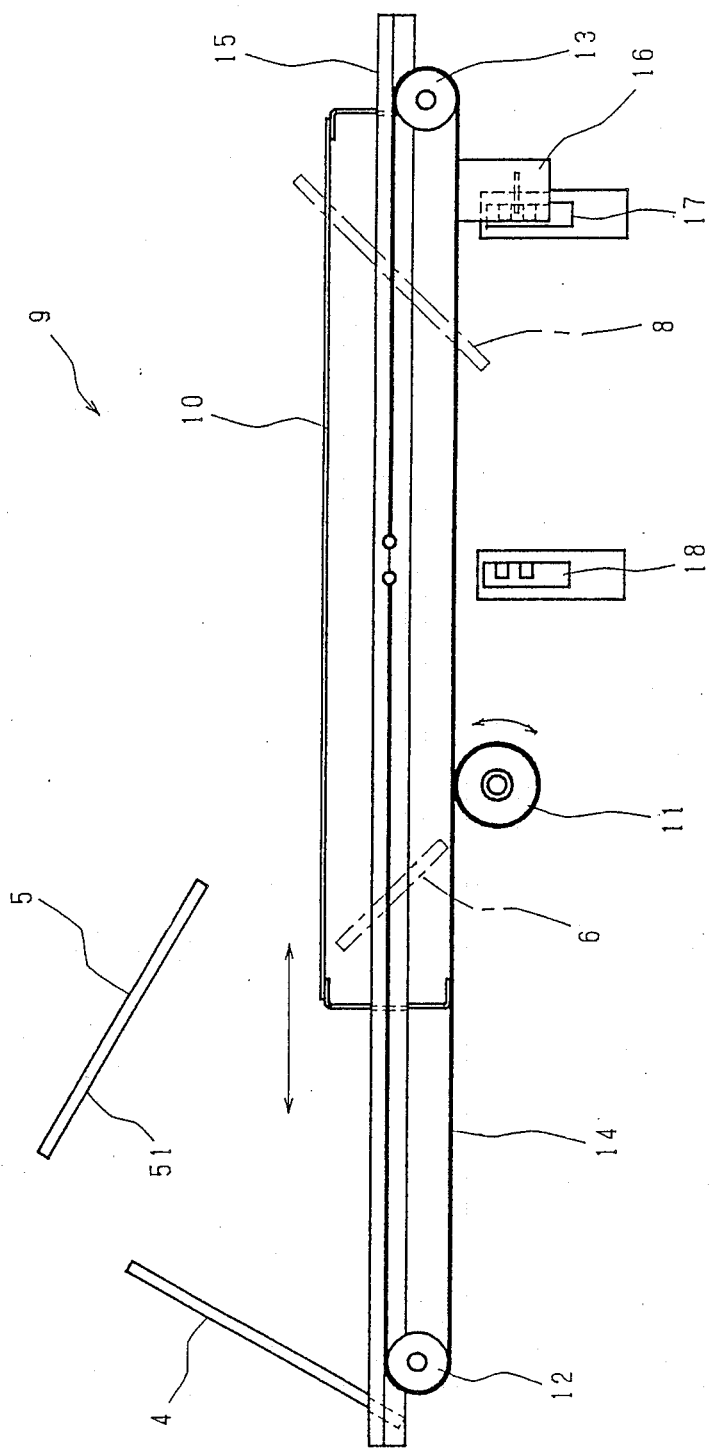
FIGS. 5 and 6 are respectively sectional diagrams of the mirror transfer mechanism.

FIG. 5 is a schematic sectional diagram of the mirror-transfer mechanism. The first and second scan mirrors 6 and 8 are integrally supported by the supporting frame 10 of the mirror-transfer mechanism, where the reflection surfaces of these scan mirrors are opposite from each other in order that these reflection surfaces are set at a right angle. The mirror-transfer mechanism 9 is provided with a drive pulley 11 which is rotated by an exclusive motor (not shown) and free pulleys 12 and 13 which are installed to both ends of the scanning route and to the frame (not shown) of the apparatus structure. An end of wire 14 wound on the drive pulley 11 is engaged with the free pulley 12 and then fixed to the supporting frame 10. The other end of wire 14 is engaged with the other free pulley 13 and then fixed to the supporting frame 10. The supporting frame 10 is led in the direction of the scan movement and also in the direction of the preliminary scan movement by means of the scan shaft 15. Positions of the first and second scan mirrors 6 and 8 are determined by operation of a pair of photoelectric sensors 17 and 18 for detecting the mark plate 16 below the supporting frame 10. The photoelectric sensor 17 is at the position capable of detecting the mark plate 16 when the first and second scan mirrors 6 and 8 are at the right-end position, i.e., when these scan mirrors are at the position completed scan-movement. The other photoelectric sensor 18 is at the position capable of detecting the mark plate 16 when the first and second scan mirrors 6 and 8 are at the left-end position, i.e., when these scan mirrors are at the scan-movement starting position. FIG. 5 shows the light-path switching mirror 5 which stands still at the operating position.

The first and second scan mirrors 6 and 8 having the transfer mechanism 9 above mentioned are respectively transferred in accordance with the process described below.

Based on the signals from the photoelectric sensors 17 and 18 identifying the detected mark plate 16, the drive motor is properly driven in the normal and inverse directions. Being led by the scan shaft 15, the supporting frame 10 is reciprocated by the wire 14 via drive pulley 11 and the free pulleys 12 and 13. Following this reciprocating movement, the first and second scan mirrors 6 and 8 respectively more over the plane between the right-end position and the left-end position before being set to the pre-determined position. The speed of the rotation of the drive motor is controlled in order that the scan-moving speed of the microfilm scanner can be held faster at the time of the light-measurement than the scan-moving speed at the time of image scanning, for example, by double.

Figure 6:
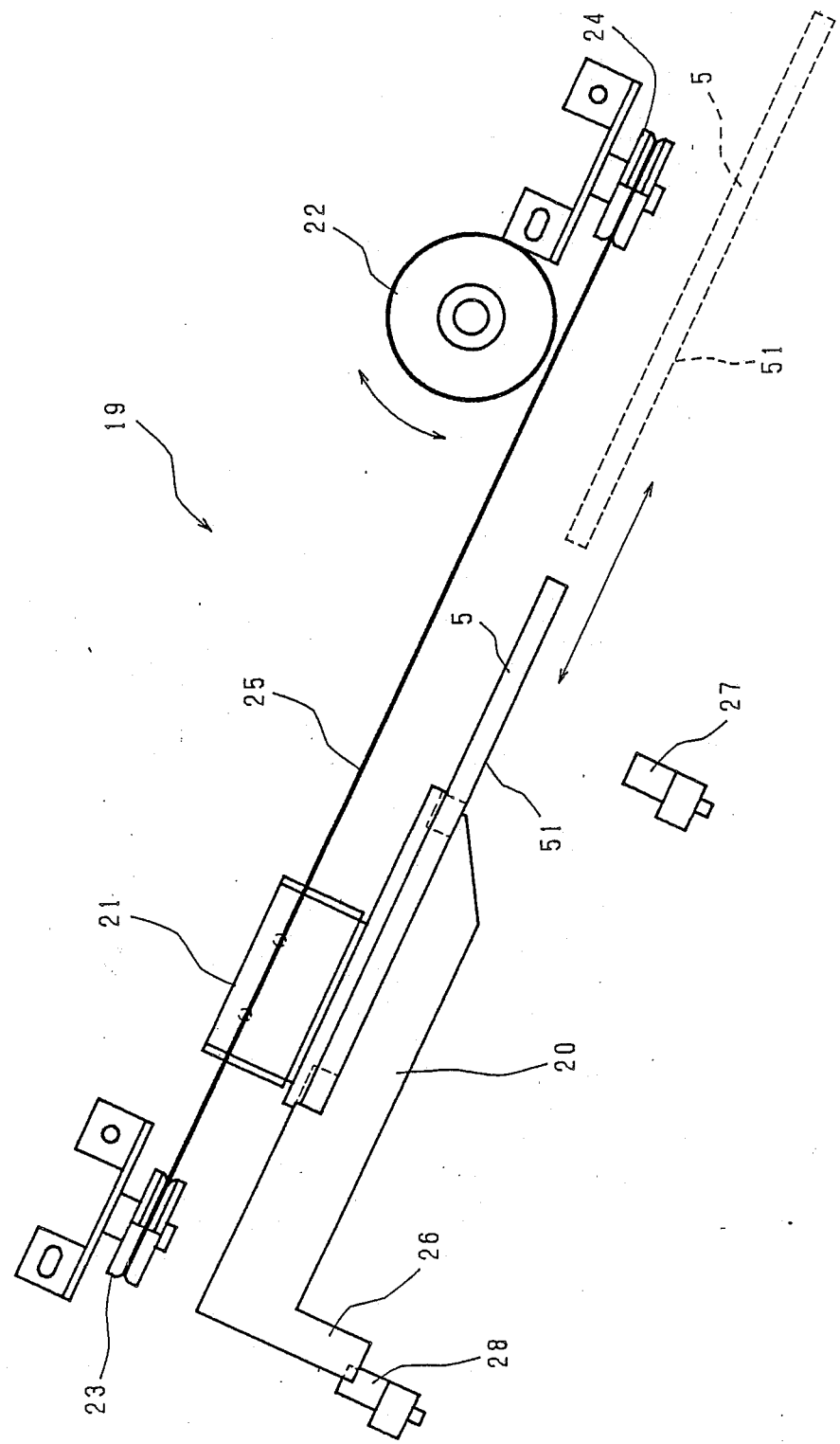

FIG. 6 is a schematic sectional diagram of the transfer mechanism 19 for transferring the position of the light-path switching mirror 5. As mentioned earlier, the light-path switching mirror 5 can slide itself along the same plane of the mirror surface 51. The transfer mechanism 19 is composed of the following; supporting plate 20 which fixedly supports the light-path switching mirror 5, base 21 which is secured to the supporting plate 20, drive pulley 22 which is rotated by the exclusive motor (not shown) via gears, and free pulleys 23 and 24 which are respectively secured to frames (not shown) of the apparatus structure at both ends in the sliding direction of the light-path switching mirror 5. An end of the wire 25 wound on the drive pulley 22 is engaged with the free pulley 23 and then secured to the base 21 of the supporting plate 20. The other end of the wire 25 is engaged with the other free pulley 24 and then secured to the base 21 of the supporting plate 20. The supporting plate 20 is guided by rail (not shown) in order that the plate itself can slide in the transfer direction which is obliquely apart from the level. The position of the light-path switching mirror 5 is determined by operation of a pair of photoelectric sensors 27 and 28 for detecting the mark plate 26 protruding below the supporting plate 20.

The photoelectric sensor 27 is at the position capable of detecting the mark plate 26 when the light-path switching mirror 5 is at the shelter position which is the terminal of the transfer movement of this mirror 5. The other photo electric sensor 28 is at the position capable of detecting the mark plate 26 when the light-path switching mirror 5 is at the operating position which is the other terminal of the sliding movement of this mirror 5.

Transfer movement of the light-path switching mirror 5 having the transfer mechanism 19 mentioned above is executed according to the process described below.

Based on the signal from the photoelectric sensors 27 and 28 identifying the detected mark plate 26, the drive motor is properly driven in the normal and inverse directions. Being guided by rail, the supporting plate 20 is reciprocated by the wire 25 via the drive pulley 22 and the free pulleys 23 and 24. Following this reciprocating movement, the light-path switching mirror 5 slides itself in the oblique direction between the shelter position and the operating position before coming to a stop at the predetermined position.

Figure 7:
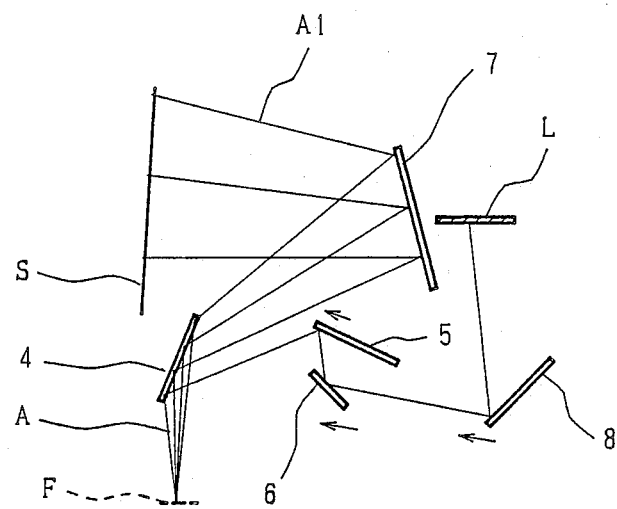
FIGS. 7(1)–7(4) are diagrams explaining the principle of the functional operation of the optical system while modeswitching process is underway.
Figure 7:
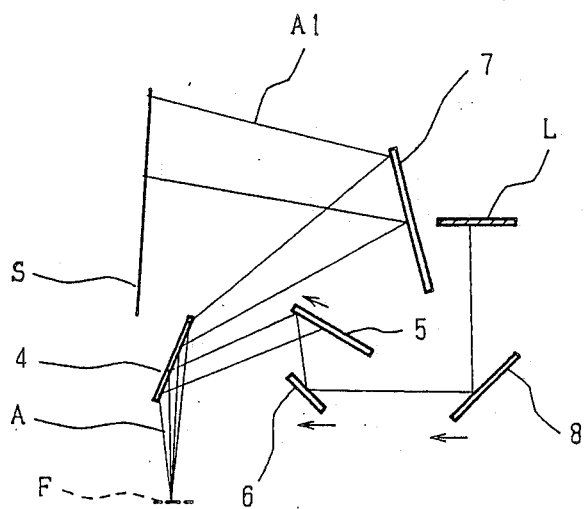
Figure 7:
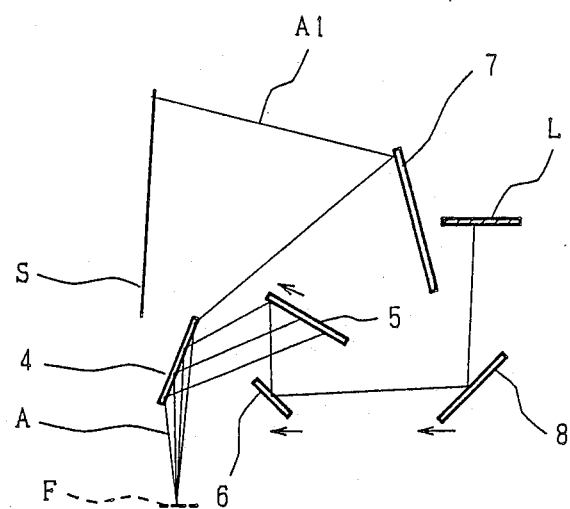
Figure 7:
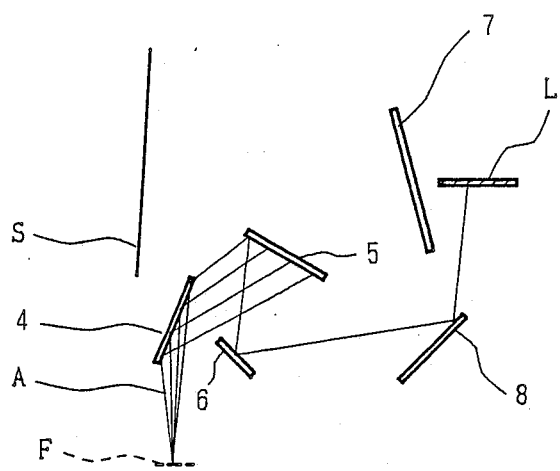
Figure 8:
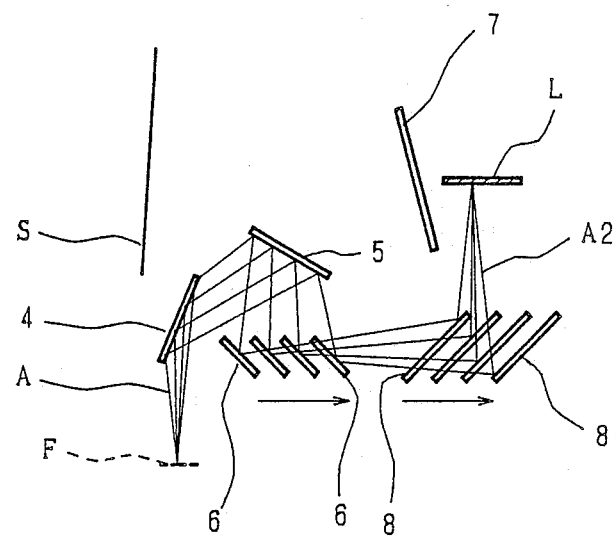
FIG. 8 is a diagram explaining the principle of the optical system in the image reading mode.
Figure 9:
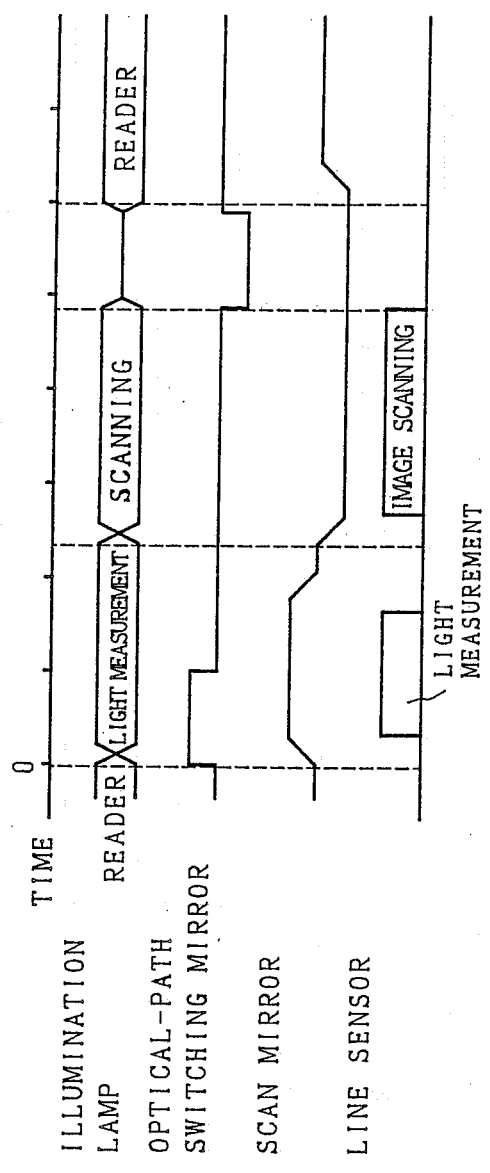
FIG. 9 is a time chart representing the operation timing of the optical system related to the invention.

Next, functional operation of the microfilm scanner featuring the above structure is described below. FIGS. 7 (1) through (4) are respectiely schematic diagrams representing the operation of the optical system in connection with the shift of the mode from the reader mode to the scanning mode. FIG. 7 (1) represents the initial stage of the mode switching operation. FIG. 7 (2) represents the interim stage. FIG. 7 (3) represents the progressed interim stage. FIG. 7 (4) represents the final stage of the mode switching operation. FIG. 8 is a schematic diagram representing the operation of the microfilm scanner in the scanning mode. FIG. 9 is a time chart representing the operation timing of essential components of the microfilm scanner related to the invention.

In the reader mode, first light-source lamp 1 lights up in order that the reader light path A1 can be formed. The light-path switching mirror 5 is at the shelter position. The first and second scan mirrors 6 and 8 are at the right-end position, which respectively remain still outside of the reader light path A1 (see FIG. 4).

Next, during the switching period to the scanning mode from the reader mode, the optical system measures light of the image. First, the drive motor of the transfer mechanism 19 is activated. This allows the light-path switching mirror 5 to gradually slide itself from the shelter position to the operating position. Simultaneously, the drive motor of the transfer mechanism 9 is activated. The first and second scan mirrors 6 and 8 gradually move themselves from the right-end position to the left-end position in connection with each other (see FIG. 7 (1) through (3)).

Constant volume of light generated by the light-source lamp 1 first arrives at the stationary mirror 4. Then, light is once led to the screen S via the reader mirror 7 while the reader mode is underway, and the light proceeds in the direction of the line sensor L via the light-path switching mirror 5 and the first and second scan mirrors 6 and 8. At the same time, the direction of light is gradually shifted from the bottom to the top of the image being scanned.

Using the CCD line sensor L which substantially functions as photoreception means, the optical system of the microfilm scanner measures light of the image via the light-path switching mirror 5 when the mirror is on the way from the shelter position to the operating position by sliding itself. The motor driving the light-path switching mirror 5 is turned off earlier than the motor driving the first and second scan mirrors 6 and 8. In other words, the sliding movement of the light-path switching mirror 5 is terminated earlier than the scan movement of the first and second scan mirrors 6 and 8 (see FIG. 9).

Following the completion of the light measurement, the microfilm scanner executes the image scanning operation. The light-path switching mirror 5 is brought to a stop at the operating position. Next, by the inverse rotation of the drive motor, the first and second scan mirrors 6 and 8 move themselves from the left-end position to the right-end position in connection with each other while scanning the image. Then relative to the scan movement of the first and second scan mirrors 6 and 8, the image of microfilm F is projected against the CCD line sensor L, and then, the image is exposed to light before eventually being scanned. When operating the optical system, since the light-path switching mirror 5 stays still at the operating position while the image scanning is underway, light reflected from the stationary mirror 4 is led to the first scan mirror 6 via the light-path switching mirror 5 without being routed to the reader mirror 7. As a result, even when repeatedly scanning the image for reproducing a number of printed copies for example, an image can never be projected onto the screen S.

After completing the image scanning process, the system operation restores the reader mode. The light-source lamp 1 is turned off temporarily, and at the same time, the motor driving the light-path switching mirror 5 reverses the rotation to allow the light-path switching mirror 5 to slide itself back to the shelter position. On the other hand, the motor driving the first and second scan mirrors 6 and 8 continuously reverses the rotation to transfer these to the right-end position.

In this embodiment of the invention, light is measured by applying the CCD line sensor L which is primarily used for scanning the image. In other words, the microfilm scanner embodied by the invention effectively uses the CCD line sensor L for scanning the image and measuring light as well, thus effectively saving cost. Nevertheless, the invention also allows the provision of a sensor which is exclusively usable for measuring light. In particular when applying the invention to a reader printer, such a sensor exclusively usable for measuring light is installed to a position close to the photoreceptive drum.

The microfilm scanner embodied by the invention uses the CCD line sensor L which is secured to the frame of the apparatus structure, which the image scanning process is executed by causing the first and second scan mirrors 6 and 8 to make scan movements. However, independent of this style, it is also possible for the invention to have the CCD line sensor L scan image by following up the scan an movements without allowing the first and second scan mirrors 6 and 8 to move themselves.

The CCD line sensor L introduced to this embodiment has the bottom-faced photoreceptive surface in order that the image can be projected and exposed to light from the bottom side. This effectively prevents dust particles from adhering themselves onto the photoreceptive surface of the CCD line sensor L. Consequently, occurrence of noise and/or faulty symptom caused by adhesion of dust can securely be reduced from the scanned image, this improving the overall quality of the image.

In many cases, conventional microfilm scanners are provided with line sensors whose photoreceptive surfaces look upward, and as a result, dust easily adheres to the photoreceptive surface and often causes noise and/or faulty symptom to take place with the scanned image. To solve this problem, there is a certain microfilm scanner which merely disposes the photoreceptive surface of the line sensor to look downward and provides the upward-looking stationary mirror immediately before the line sensor in order that the projected light can be led to the sensor L. However, this system incurs adhesion of dust on the surface of the stationary mirror and generation of noise and faulty symptom in the scanned image, thus eventually results in ineffective improvement.

On the other hand, the embodiment of the invention provides the microfilm scanner comprising the first and second scan mirrors 6 and 8 having upward-looking mirror surfaces so that the projected light can be delivered to the CCD line sensor L directly. Nevertheless, the scan movement of these mirrors 6 and 8 respectively generates a flow of air in the ambient portion of the mirror surface. As a result, the flowing air effectively blows off dust from the mirror surface, and thus, the image can be prevented from incurring noise or faulty symptom otherwise caused by the adhered dust. Furthermore, since the light from the first and second scan mirrors 6 and 8 is directly led to the line sensor L, sufficient distance can be secured between both. In addition, the microfilm scanner embodied by the invention disposes the CCD line sensor L at the back of the stationary mirror 7 which projects the image against the screen S, thus making it possible for the invention to provide a compact structure.

Next, the position relationship between the light-path switching mirror 5 and the first and second scan mirrors 6 and 8 is described below. In the initial stage of the mode-switching process shown in FIG. 7 (1) when the first and second scan mirrors 6 and 8 have respectively proceeded to the position where the bottom edge of the image is oriented to the CCD line sensor L, it is essential that the light-path switching mirror 5 be already at the position where the light projected against the bottom edge of the image is oriented to the first scan mirror 6.

When in those stages shown in FIGS. 7 (2), (3) and (4), the timing for switching the light path across the image-projecting path A via the sliding movement of the light-path switching mirror 5 should be faster than the scan movement of the first and second scan mirrors 6 and 8.

As a result, the speed of the sliding movement of the light-path switching mirror 5 should be faster than the transfer speed of the first and second scan mirrors 6 and 8. By moving the light-path switching mirror 5 at a very fast speed, the microfilm scanner can sufficiently shorten the time needed for projecting the image against the screen S while the mode-switching process is underway, and at the same time, the microfilm scanner drastically minimizes an uncomfortable view.

The microfilm scanner embodied by the invention executes the measurement of light before scanning the image, wherein light is measured by means of the light-path switching mirror 5 which slides itself along the plane of the mirror surface. Light measurement is accomplished by means of the CCD line sensor L throughout the entire image region, and yet, the light measurement can be done at the focused position, and thus, the microfilm scanner embodied by the invention can correctly detect the image density, image density distribution, and the image position.

Concretely, sampled data produced from the measurement of light is delivered to a controller (not shown) composed of a microcomputer. The controller analyzes and processes the inputted data. Next, control signals which properly deal with the data produced from the light measurement are delivered to the light-source lamp 1, masking processor, position regulator dealing with microfilm F and screen S, and other essential elements via the drive circuit so that appropriate control can be accomplished in the ensuing image scanning process. The object of the light measurement is not always defined to suffice the above requirements, but it may also be applied to other purposes like identification of the negative and positive image.

Next, the system for detecting the image position is described below. For example, as mentioned earlier, the microfilm scanner related to the invention measures light throughout the entire image region, and yet, it measures light at the focused position, and thus, the microfilm scanner correctly detects the image position based on the sampled data. Owing to the correctly detected image position, the microfilm scanner easily scans only the needed image portion during the scanning mode. As a result, the microfilm scanner effectively scans only the needed image portion without performing the image-frame masking and the position adjustment of the image on the screen S.

Furthermore, owing to the correctly detected image position, on the basis of the sampled data covering only the needed image portion, the microfilm scanner can set up the threshold value of the reference voltage for controlling the entire system operation. Even if the image is extremely smaller than the output region, the microfilm scanner can set the optimum threshold valve independent of the basic density.

Since the microfilm scanner can correctly detect the image position, the image memory of the CCD line sensor L may be of such a capacity which merely corresponds to the magnitude of the image to be scanned. As a result, compared to the case in which the image is processed after completing the scanning of the entire image region, the capacity of the image memory may be significantly modest.

Figure 10:
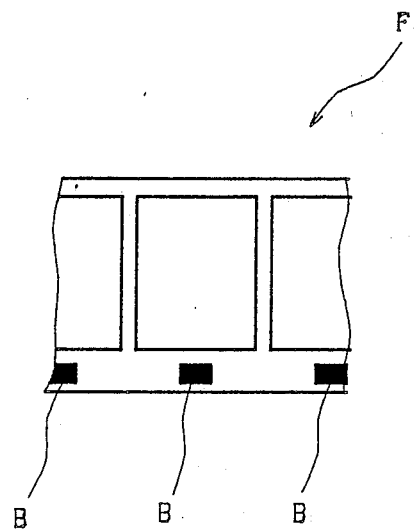
FIG. 10 is a schematic diagram of the microfilm provided with blip marks.

Next, the blip-mark detection system embodiment by the invention is described below. FIG. 10 is a schematic plan of microfilm F provided with blip marks B. The indexing blip mark B is provided in the ambient portion of each image. When using microfilm F having blip marks B in the micorfilm projecting apparatus, the following can be taken into consideration.

The transfer movement of the light-path switching mirror 5 and the first and second scan mirrors 6 and 8 are provisionally brought to a stop at the position where the light projected against the blip marks B is oriented to the CCD line sensor L. For example, by provisionally stopping the movement of these components during the initial stage of the light measurement shown in FIG. 7 (1), the microfilm scanner scans the blip marks B by projecting and exposing the image of blip marks B against the CCD line sensor L. On the basis of the scanned data, the carrier is controlled in order to index the iamge. Concretely, by providing the CCD line sensor L with the function for detecting the blip marks B in addition, the microfilm scanner can save cost.

As is clear form the above description, the microfilm scanner embodied by the invention switches the image-projecting light path by causing the light-path switching mirror 5 to slide itself along the mirror surface, and thus, the measurement of light is executed while the mode switching process is underway. Consequently, the time needed for processing the image is significantly saved. Furthermore, since the optical system of the microfilm scanner can measure the light before processing the image throughout the entire image region at the focused position, the system can precisely detect the image density. Thus, the microfilm scanner embodied by the invention provides effective severe control of the luminance of the light source. The apparatus easily outputs binary-coded scanned image data and correctly sets the threshold value of the reference voltage needed for applying dither process to a neutral-tone image. Furthermore, the microfilm scanner detects the correct position of an image and easily executes a masking process and position adjustment, and in addition, it minimizes occurrence of faulty copying and saves cost.

As described earlier, any conventional microfilm projecting apparatus independently needs a certain time for switching the reader mode into the scanning mode and a certain time for measuring light for each image. Only after completing these processes, is an image process like image scanning executed, and thus, as a whole, any conventional microfilm projecting apparatus is obliged to spend much time before completing the entire image processing requirements.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A microfilm projecting apparatus for projecting an image of a microfilm on a screen and projecting the same on a photoreception means, comprising:
   a reflector being movably provided between a first position out of an image projecting light path and a second position in said image projecting light path, and being movable from the first position to the second position along a plane including the reflecting surface thereof, for reflecting the image projecting light to said photoreception means at said second position,
   said image projecting light traveling to the screen while the reflector is at said first position; and
   detecting means for detecting the density of the image by receiving the image projecting light reflected by said reflector while said reflector is moving from the first position to the second position.

2. The microfilm projecting apparatus as set forth in claim 1, wherein said detecting means is a CCD line sensor.

3. The microfilm projecting apparatus as set forth in claim 1, wherein said detecting means has a photoreceptive surface which is disposed looking downward.

4. A microfilm projecting apparatus for projecting an image of a microfilm on a screen and for projecting the same on a photoreception means comprising:
   a projection lens;
   a first reflector fixedly provided for reflecting the light from the projection lens;
   a second reflector fixedly provided to be opposite to the screen for reflecting the light from the first reflector to the screen;
   a third reflector being provided movable between a first position out of a light path from the first reflector to the second reflector and a second position in said light path, and being movable from the first position to the second position along a plane including the reflecting surface thereof, for reflecting the light from the first reflector at said second position;
   means for directing the light from the third reflector to the photoreception means; and
   detecting means for detecting the density of the image by receiving the light reflected by the third reflector while the third reflector is moving from the first position to the second position.

5. The microfilm projecting apparatus as set forth in claim 4, wherein said detecting means is a CCD line sensor.

6. The microfilm projecting apparatus as set forth in claim 4, wherein said detecting means has a photoreceptive surface which is disposed looking downward.

7. A microfilm projecting apparatus for projecting an image of a microfilm on a screen and for projecting the same on image sensor means for obtaining electric image data according to the image, comprising:
   a projection lens;
   a first reflector fixedly provided to be opposite to the projection lens for reflecting the light from the projection lens;
   a second reflector fixedly provided to be opposite to the screen for reflecting the light from the first reflector to the screen;
   a third reflector movably provided between a first position out of a light path from the first reflector to the second reflector and a second position in said light path, for reflecting the light from the first reflector at said second position;
   said image sensor means being disposed behind the second reflector; and
   means for directing the light from the third reflector to the image sensor means.

8. The microfilm projecting apparatus as set forth in claim 7, wherein said image sensor means has a photoreceptive surface which is disposed looking downward.

9. A microfilm projecting apparatus for projecting an image of a microfilm on a screen in a first operational mode and for projecting the same on an image sensor means for obtaining electric image data according to the image in a second operational mode, comprising:
   a projection lens;
   a reflector opposite to the screen for directing the light thereto;
   said image sensor means being disposed behind the reflector; and means for directing the light passed through the projection lens to the reflector in the first operational mode and for directing the same to the image sensor means in the second operational mode.

10. A microfilm projecting apparatus as claimed in claim 9, wherein said image sensor means has a photoreceptive surface which is disposed looking downward.

11. In a microfilm projecting apparatus which projects an image of a microfilm on a screen in a first operational mode and projects the same on an image sensor means for obtaining electric image data according to the image in a second operational mode, the improvement comprising a reflector opposite to the screen for projecting the image thereon, and the image sensor means being disposed behind the reflector and having a photoreceptive surface which is disposed looking downward.

* * * * *

UNITED STATES PATENT AND TRADEMARK OFFICE
CERTIFICATE OF CORRECTION

PATENT NO. : 4,963,923

DATED : October 16, 1990

INVENTOR(S) : Hideaki Kusano, et al

It is certified that error appears in the above-identified patent and that said Letters Patent is hereby corrected as shown below:

In col. 2, line 11, delete "the".

In col. 6, line 63, before "which" insert --in--

In col. 8, line 58, change "embodiment" to --embodied--

In col. 8, line 61, change "mark B is" to --marks B are--

In col. 9, line 23, delete "severe".

In col. 9, line 27, change "a" to --the--.

Signed and Sealed this

Twenty-first Day of April, 1992

Attest:

HARRY F. MANBECK, JR.

*Attesting Officer*  *Commissioner of Patents and Trademarks*